US007940709B2

(12) United States Patent
Curcio, Jr. et al.

(10) Patent No.: US 7,940,709 B2

(45) Date of Patent: May 10, 2011

(54) SERVICE PROVISION AT A NETWORK ACCESS POINT

(75) Inventors: Joseph A. Curcio, Jr., Folsom, CA (US); James G. Wendt, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 11/742,520

(22) Filed: Apr. 30, 2007

(65) Prior Publication Data

US 2008/0267099 A1 Oct. 30, 2008

(51) Int. Cl.
*H04B 7/00* (2006.01)

(52) U.S. Cl. .................... 370/310.1; 370/438; 455/346.4

(58) Field of Classification Search ............... 370/310.1, 370/438, 439; 307/43; 455/346.4
See application file for complete search history.

(56) References Cited

U.S. PATENT DOCUMENTS

| | | | | |
|---|---|---|---|---|
| 6,735,450 | B1 * | 5/2004 | Remmert | 455/550.1 |
| 2006/0084387 | A1 * | 4/2006 | DiFazio | 455/63.4 |
| 2006/0105779 | A1 * | 5/2006 | Uta et al. | 455/456.1 |
| 2006/0229746 | A1 * | 10/2006 | Ollis et al. | 700/65 |
| 2006/0230270 | A1 * | 10/2006 | Goffin | 713/173 |
| 2006/0246911 | A1 * | 11/2006 | Petermann | 455/444 |
| 2006/0263925 | A1 * | 11/2006 | Chandler | 438/61 |
| 2007/0253382 | A1 * | 11/2007 | Ghassemzadeh et al. | 370/338 |

* cited by examiner

*Primary Examiner* — CongVan Tran

(57) ABSTRACT

A system for providing one or more services at a network access point is described. The system comprises a controller, a wireless interface coupled with the controller, a network interface coupled with the controller, at least one of an internal interface coupled with the controller and an external interface coupled with the controller, and at least one of one or more internal modules coupled with the internal interface and one or more external modules coupled with the external interface.

20 Claims, 3 Drawing Sheets

SERVICE PROVISION AT A NETWORK ACCESS POINT

BACKGROUND

Visual security is one way to secure a building, area, or other location and is also useful for history forensics, emergency response, and hazard recognition. Wireless networking and other services are separately supplied from systems providing visual security.

DESCRIPTION OF THE DRAWINGS

One or more embodiments is illustrated by way of example, and not by limitation, in the figures of the accompanying drawings, wherein elements having the same reference numeral designations represent like elements throughout and wherein.

DETAILED DESCRIPTION

Figure 1:
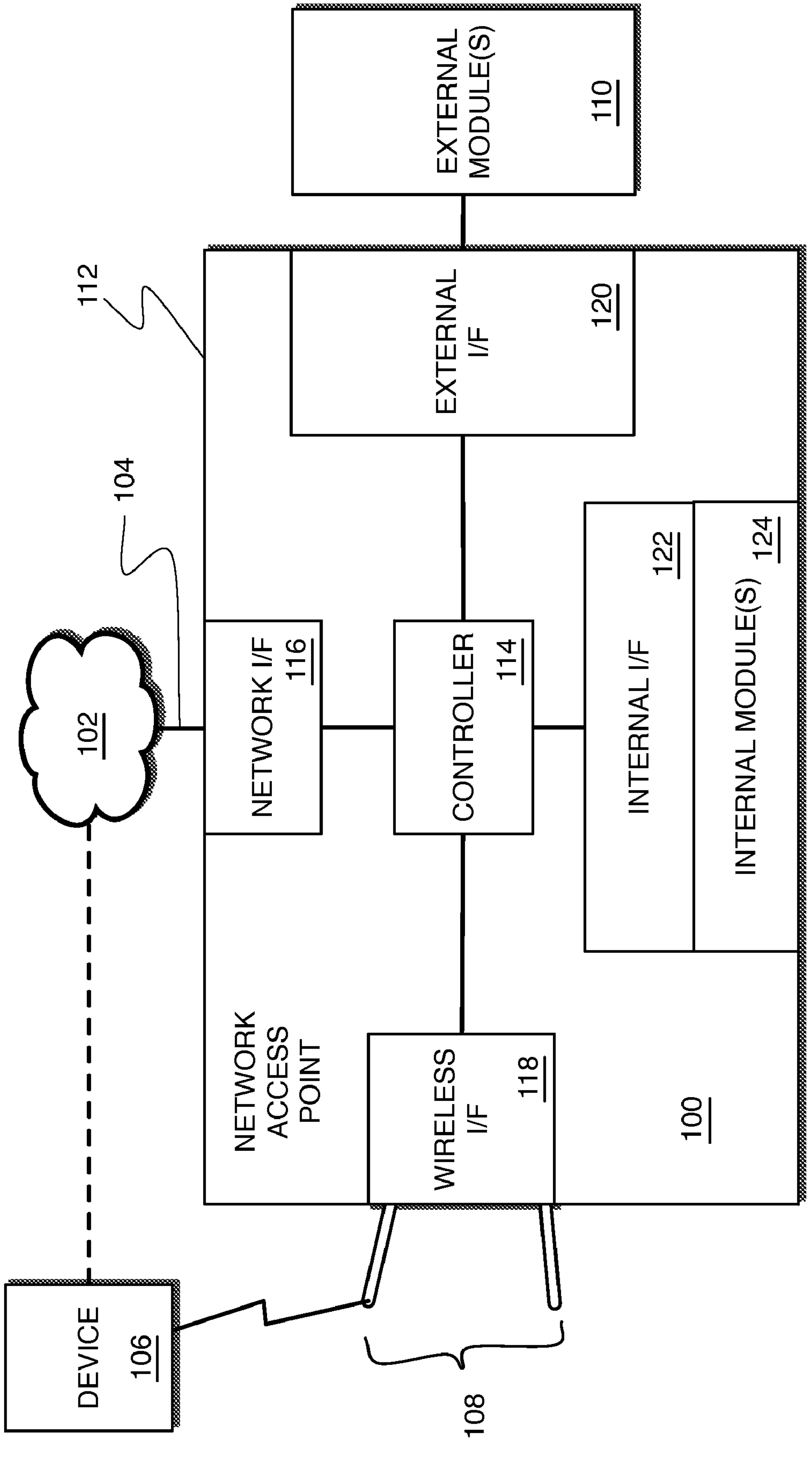
FIG. 1 is a high-level functional block diagram of a network access point according to an embodiment.

FIG. 1 depicts a network access point 100 according to an embodiment communicatively coupled with a network 102 via a network connection 104. In at least some embodiments, network connection 104 may be a wired and/or wireless connection. In at least some embodiments, network connection 104 is an ethernet network connection. In at least one embodiment, network connection 104 is an ethernet network connection providing power to drive network access point 100 in addition to transmission of network communication between the network access point and network 102, e.g., a power over ethernet (POE) network connection. In at least some embodiments, network connection 104 as a power providing network connection is the exclusive mechanism for providing power to drive network access point 100.

Network access point 100 communicatively couples a device 106, e.g., a computing device such as a laptop, handheld, desktop, or other device able to communicate wirelessly, to network 102 via one or more wireless networking protocols using at least one of a pair of antennas 108 connected with the network access point. In some embodiments, device 106 connects with network access point 100 via both antennas 108. In at least some embodiments, network access point 100 comprises a single antenna and/or more than two antennas. One or more external modules 110 for receiving and/or transmitting information are communicatively coupled with network access point 100. In at least some embodiments, external module(s) 110 are communicatively coupled with network access point 100 via wired and/or wireless connections.

In at least some embodiments, device 106 may be directly connected with network 102.

Network access point 100 comprises a housing 112. Housing 112 comprises a mount mechanism, e.g., one or more holes, hooks, and/or fasteners, for attaching network access point 100 to a wall, ceiling, or other interior or exterior location on a building. In at least some embodiments, housing 112 may be mounted to a room or hallway ceiling, a roof or eave of a building, or other location.

Network access point 100 comprises a controller 114, e.g., a processor, application specific integrated circuit (ASIC), or other instruction-based device, for controlling operation of the network access point. Controller 114 is communicatively coupled with a network interface 116 which provides communication connectivity with network 102. In at least some embodiments, network interface 116 further transfers power received via network connection 104 to network access point 100 to drive operation of the network access point and components therein. Network interface 116 provides bidirectional communication capabilities between network access point 100 and network 102. In at least some embodiments, network interface 116 may provide a wired and/or wireless connection to network 102.

Network access point 100 further comprises a wireless interface 118 for communication with device 106. Wireless interface 118, under control of controller 114, transfers communications between device 106 and network interface 116 and, in turn, network 102. In at least some embodiments, wireless interface 118 may support one or more wireless protocols, e.g., 802.11 a/b/g/n, and other wireless communication protocols.

An external interface 120 communicatively couples external module 110 with network access point 100, and in particular controller 114, via a wired and/or a wireless connection. External interface 120 comprises one or more connections to which one or more external modules 110 may be coupled to communicate with network access point 100. In at least some embodiments, external interface 120 provide uni-directional communication with one or more external modules 110. In at least some embodiments, external interface 120 provides bi-directional communication with one or more external modules 110. In at least some further embodiments, external interface 120 provides both uni-directional and bi-directional communication with one or more external modules 110. In at least some embodiments, external interface 120 supplies power to one or more external modules 110. In at least some embodiments, external interface 120 receives power from network interface 116.

An internal interface 122 communicatively couples one or more internal modules 124, for receiving and/or transmitting information, with controller 114. In at least some embodiments, internal interface 122 enables the addition and/or removal of one or more internal modules 124 to/from network access point 100. In at least some embodiments, internal interface 122 comprises one or more standard communication interface connections, e.g., serial and/or parallel connections. In at least some embodiments, internal interface 122 supplies power to one or more internal modules 124. In at least some embodiments, internal interface 122 receives power from network interface 116. In at least some embodiments, one or more internal modules 124 receives power directly from network interface 116.

In at least some embodiments, device 106 may connect to network access point 100 via either network 102 and network interface 116 or via wireless connection using antenna 108 and wireless interface 118 in order to provide commands and/or receive information from the network access point. For example, device 106 may receive status information and/or signals obtained by one or more external and/or internal modules 110, 124.

In at least some embodiments, network access point 100 comprises a memory for storing one or more sets of executable instructions which, when executed by controller 114, cause the controller to perform one or more functions. In at least some embodiments, controller 114 may comprise memory internal to the controller. In at least some embodiments, one or more of controller 114, network interface 116, wireless interface 118, external interface 120, and internal interface 122 may be communicatively coupled to a bus.

Figure 2:
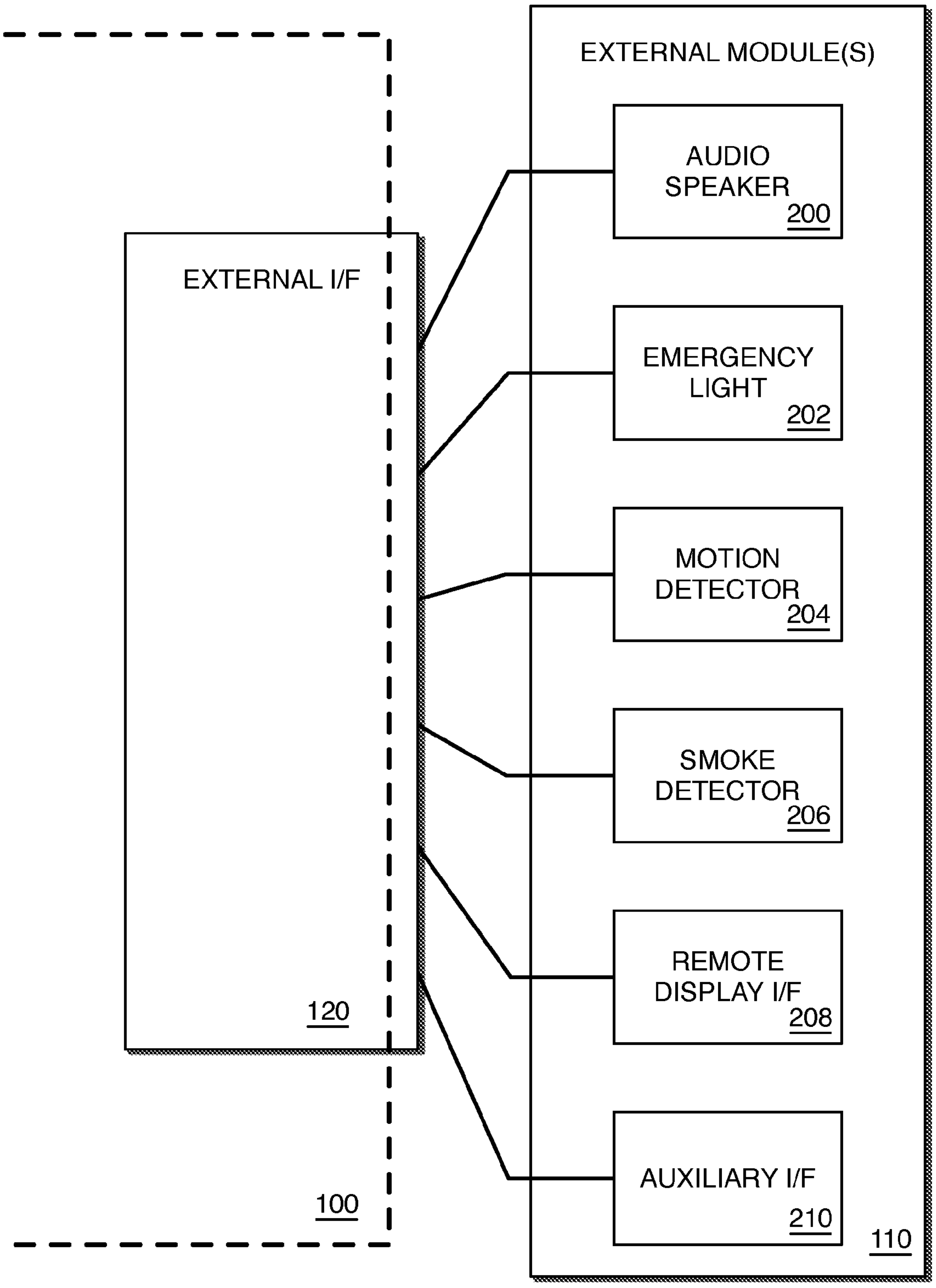
FIG. 2 is a functional block diagram of an external interface according to an embodiment.

FIG. 2 depicts a functional block diagram of the connection between external interface 120 and several external modules 110. External modules 110 represents a set of one or more individual modules for connection with network access point 100. Exemplary external modules 110 comprise an audio speaker 200, an emergency light 202, a motion detector 204, a smoke detector 206, a remote display interface 208, and an auxiliary interface 210. Each external module 110, i.e., modules 200-210, is connected with external interface 120 via a wired connection. In at least some embodiments, one or more of external modules 110 may receive power for operation via external interface 120.

In at least some embodiments, each external module 110 may be connected with external interface 120 via a wireless connection. In at least some embodiments, one or more external module 110 may be connected with external interface 120 via a bus or other connection. In at least some embodiments, greater or lesser number of external modules 110 may be connected with external interface 120.

Audio speaker 200 comprises circuitry for generating audio frequencies based on a received signal from network access point 100 via external interface 120. In at least some embodiments, audio speaker 200 generates audio frequencies which are audible at least exterior to housing 112. In at least some embodiments, audio speaker 200 may be driven to generate an emergency signal based on input received by network access point 100 from: another external module 110 via external interface 120; an internal module 124 via internal interface 122; from network 102 via network interface 116; device 106 via wireless interface 118; and controller 114.

Emergency light 202 comprises circuitry for generating light exterior to housing 112 at one or more frequencies based on a received signal from network access point 100 via external interface 120. In at least some embodiments, emergency light 202 may generate light sufficient to illuminate an area adjacent network access point 100. In at least some embodiments, emergency light 202 may be driven to generate light based on input received by network access point 100 from: another external module 110 via external interface 120; an internal module 124 via internal interface 122; from network 102 via network interface 116; device 106 via wireless interface 118; and controller 114.

Motion detector 204 comprises circuitry for detecting movement of objects, e.g., people, animals, machinery, etc., within a region adjacent to network access point 100. In at least some embodiments, motion detector 204 comprises a passive and/or an active detection mechanism. Motion detector 204 communicates with controller 114 via external interface 120. In at least some embodiments, motion detector 204 receives commands from controller 114, e.g., activating, deactivating, specifying detection thresholds, specifying reporting thresholds, etc., and transmits information to the controller, e.g., a detection alert, status, an image, a video, etc.

In at least some embodiments, network access point power and antenna pattern may be determined based on visual queues and motion detection signals received from motion detector 204. In at least some embodiments, wireless interface 118 may be modified, e.g., turned on/off, etc., based on a motion detection signal indicating entry of an individual into a particular room and/or proximity to network access point 100. In at least some embodiments, network access point 100 may use video images, e.g., as captured by camera 300 and subjected to processing by controller 114, to control wireless interface 118 parameters such as antenna power and pattern based on a determined trajectory of an individual and/or device. In at least some embodiments, one or more input signals received from external interface 120 and/or internal interface 122 may be used to cause network access point 100 to enter a power down and/or energy saving mode.

Smoke detector 206 comprises circuitry for detecting smoke in a region proximate to network access point 100. In at least some embodiments, smoke detector 206 comprises one or more of a smoke detector, a heat detector, and a carbon monoxide detector. In at least some embodiments, smoke detector 206 detects smoke through use of optical detection and/or ionization. In at least some embodiments, smoke detector 206 further comprises a battery backup power source. Smoke detector 206 transmits a smoke detection signal to network access point 100 via external interface 120 in response to detection of smoke. In some embodiments, smoke detector 206 transmits a heat detection signal and/or a carbon monoxide detection signal to network access point 100. In at least some embodiments, smoke detector 206 receives a command from controller 114, e.g., enabling, disabling, threshold setting, etc., to control operation of the smoke detector.

In at least some embodiments, network access point 100 may supply power to one or more external modules 110 in order to recharge a backup battery, e.g., a backup battery of smoke detector 206, emergency light 202, etc.

Remote display interface 208 comprises circuitry for connecting an external display interface to network access point 100 at a location remote from the network access point. In at least some embodiments, remote display interface 208 comprises a display for displaying information from network access point 100 and one or more user input devices for receiving user commands for transmission to the network access point. In at least some embodiments, remote display interface 208 may comprise a cathode-ray tube, liquid crystal display, organic light emitting diode, or other type display device. In at least some embodiments, remote display interface 208 may comprise a keyboard, mouse, trackball, pen, or other user input device. In still further embodiments, remote display interface 208 may comprise a wireless connection interface for wirelessly connecting a display and user interface device to network access point 100.

Auxiliary interface 210 comprises circuitry for receiving commands and transmitting information to a connected device. In at least some embodiments, a computing device, e.g., device 106, may be connected to auxiliary interface 210 to update, command, and/or receive information from network access point 100.

Figure 3:
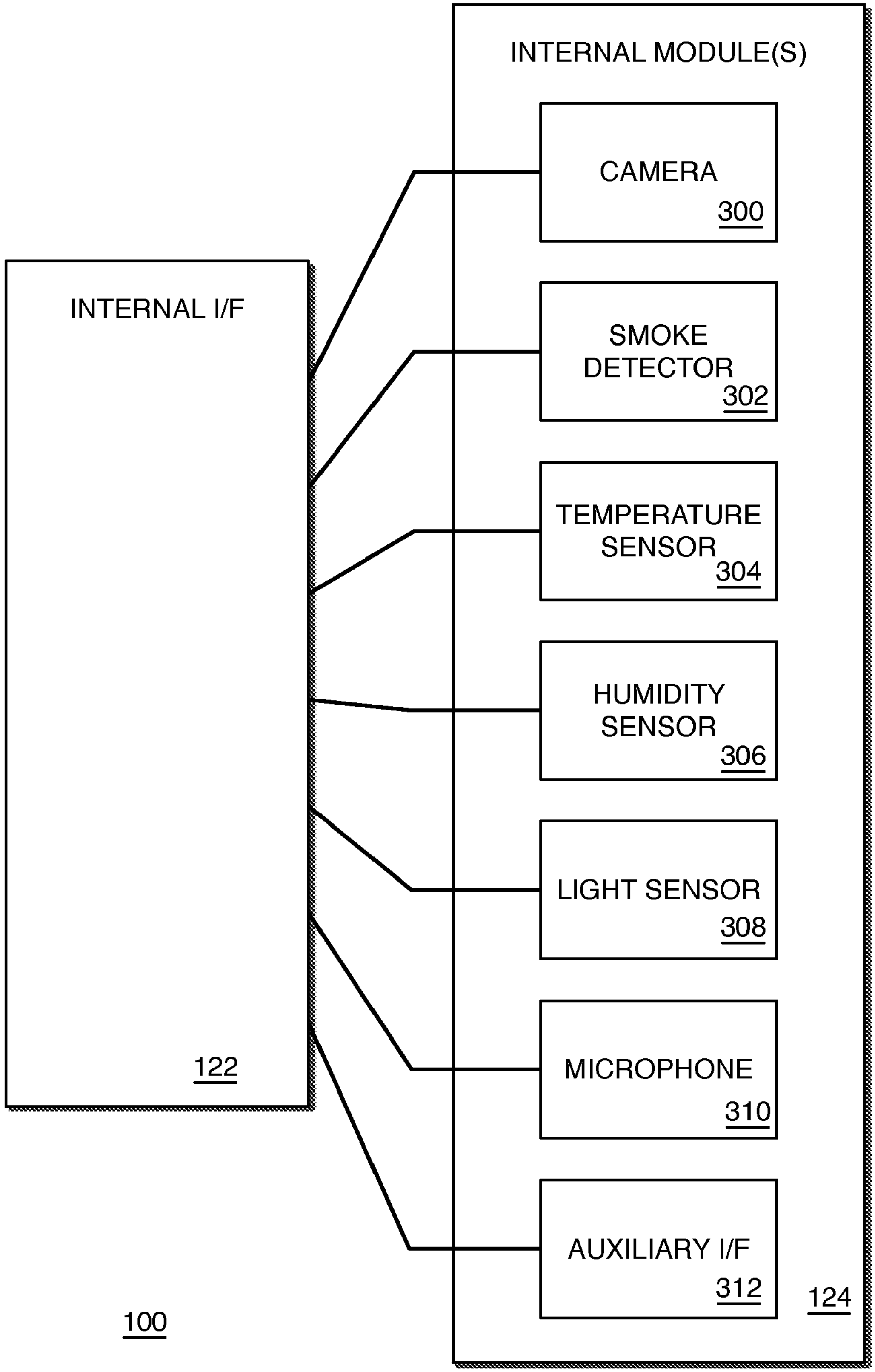
FIG. 3 is a functional block diagram of an internal interface according to an embodiment.

FIG. 3 depicts a functional block diagram of the connection between internal interface 122 and several internal modules 124. Internal modules 124 represents a set of one or more individual modules for connection with network access point 100. Exemplary internal modules 124 comprise a camera 300, a smoke detector 302, a temperature sensor 304, a humidity sensor 306, a light sensor 308, a microphone 310, and an auxiliary interface 312. Each internal module 124, i.e., modules 300-312, is connected with internal interface 122 via a wired connection. In at least some embodiments, one or more of internal modules 124 may receive power for operation via internal interface 122.

In at least some embodiments, each internal module 124 may be connected with internal interface 122 via a wireless connection. In at least some embodiments, one or more internal module 124 may be connected with internal interface 122 via a bus or other connection. In at least some embodiments, greater or lesser number of internal modules 124 may be connected with internal interface 122.

Camera 300 comprises circuitry for capturing images in a region proximate to network access point 100. In at least some embodiments, camera 300 acquires images responsive to a command received from controller 114 via internal interface 122. In at least some embodiments, camera 300 acquires one or more than one image and in some embodiments, the camera operates to acquire a sequence of images, e.g., a video, of a region viewable from network access point 100. In at least some embodiments, camera 300 automatically acquires one or more images according to a predetermined schedule received from network access point 100. In at least some embodiments, camera 300 acquires an image responsive to receipt of a signal from one of motion detector 204, smoke detector 206, or one or more of internal and external modules 124, 110. For example, transmission of a signal from motion detector 204 may cause camera 300 to capture an image to record the cause of the motion detection.

Smoke detector 302 is similar to smoke detector 206. Smoke detector 302 comprises circuitry for detecting smoke in a region proximate to network access point 100. In at least some embodiments, smoke detector 302 comprises one or more of a smoke detector, a heat detector, and a carbon monoxide detector. In at least some embodiments, smoke detector 302 detects smoke through use of optical detection and/or ionization. In at least some embodiments, smoke detector 302 further comprises a battery backup power source. Smoke detector 302 transmits a smoke detection signal to network access point 100 via internal interface 122 in response to detection of smoke. In some embodiments, smoke detector 302 transmits a heat detection signal and/or a carbon monoxide detection signal to network access point 100. In at least some embodiments, smoke detector 302 receives a command from controller 114, e.g., enabling, disabling, threshold setting, etc., to control operation of the smoke detector.

Temperature sensor 304 comprises circuitry for detecting an environmental parameter, e.g., the temperature proximate network access point 100. In at least some embodiments, temperature sensor 304 is arranged to detect temperature internal and/or external to housing 112. Temperature sensor 304 transmits a temperature signal to controller 114 via internal interface 122. In at least some embodiments, network access point 100 power and antenna pattern generated by wireless interface 118 may be determined based on a temperature signal received from temperature sensor 304. In at least some embodiments, wireless interface 118 may be modified, e.g., turned on/off, etc., based on the temperature signal.

Humidity sensor 306 comprises circuitry for detecting the humidity level proximate network access point 100. Humidity sensor 306 transmits a humidity signal indicating the humidity level to controller 114 via internal interface 122. In at least some embodiments, network access point 100 power and antenna pattern generated by wireless interface 118 may be determined based on a humidity signal received from humidity sensor 306. In at least some embodiments, wireless interface 118 may be modified, e.g., turned on/off, etc., based on the humidity signal.

Light sensor 308 comprises circuitry for detecting an ambient light level proximate network access point 100. Light sensor 308 transmits a light level signal to controller 114 via internal interface 122.

Microphone 310 comprises circuitry for capturing sound proximate network access point 100. Microphone 310 transmits a sound signal to controller 114 via internal interface 122. In at least some embodiments, microphone 310 comprises a buffer for storing a predetermined sound duration prior to transmission to controller 114.

Auxiliary interface 312 is similar to auxiliary interface 210. Auxiliary interface 312 comprises circuitry for receiving commands and transmitting information to a connected device. In at least some embodiments, a computing device, e.g., device 106, may be connected to auxiliary interface 312 to update, command, and/or receive information from network access point 100.

In at least some embodiments, one or more external modules 110 may be an internal module 124 and/or one or more internal modules may be an external module. In at least some embodiments, external modules 110 may further comprise camera 300, smoke detector 302, temperature sensor 304, humidity sensor 306, light sensor 308, microphone 310, and/or auxiliary interface 312. In at least some embodiments, internal modules 124 may further comprise audio speaker 200, emergency light 202, motion detector 204, smoke detector 206, remote display interface 208, and auxiliary interface 210.

What is claimed is:

1. A network access point comprising:

a controller;

a wireless interface coupled with the controller to permit the network access point to communicate with wireless devices;

a wired network interface coupled with the controller, to permit the network access point to communicate with an Ethernet network, such that the wireless interface and the wired network interface together permit the wireless devices to be able to communicate with devices on the Ethernet network through the network access point;

at least one of an internal interface coupled with the controller and an external interface coupled with the controller; and at least one of one or more internal modules coupled with the internal interface and one or more external modules coupled with the external interface, the internal modules and the external modules being security-oriented modules, wherein the internal modules and the external modules comprise one or more of a smoke detector, a temperature sensor, a humidity sensor, a light sensor, an emergency light, and a motion detector, wherein the ability of the wireless devices to communicate with the devices on the Ethernet network through the network access point, as permitted by the wireless interface and the wired network interface together, is adjusted in accordance with an output of at least one of the security-oriented modules.

2. The network access point of claim 1, wherein at least one of the external modules and the internal modules comprises a backup battery;

wherein at least one of the external modules and the internal modules are arranged to receive power to recharge the backup battery from the network access point; and wherein the network access point is itself arranged to receive power from the wired network interface using power-over-Ethernet (POE).

3. The network access point of claim 1, wherein the controller is arranged to modify wireless interface parameters based on a signal from at least one of the external modules and the internal modules.

4. The network access point of claim 1, wherein the network access point is arranged to receive power sufficient to operate the network access point, including the at least one of the internal interface and the external interface and the at least one of the internal modules and the external modules, via the wired network interface.

5. The network access point of claim 1, wherein the wired network interface is arranged to receive power for operating the network access point.

6. The network access point of claim 5, wherein one of the internal interface and the external interface is arranged to receive power from the wired network interface.

7. The network access point of claim 1, wherein one of either one or more of the internal modules or one or more of the external modules is communicatively coupled with another of either one or more of the internal modules or one or more of the external modules.

8. The network access point of claim 1, wherein the at least one of the security-oriented modules comprises the motion detector.

9. The network access point of claim 8, wherein the ability of the wireless devices to communicate with the devices on the Ethernet network through the network access point is adjusted in accordance with the output of the at least one of the security-oriented modules in that where the motion detector does not detect any motion, the network access point is powered down.

10. The network access point of claim 8, wherein the ability of the wireless devices to communicate with the devices on the Ethernet network through the network access point is adjusted in accordance with the output of the at least one of the security-oriented modules in that a power of an antenna of the network access point is adjusted in accordance with the output of the motion detector.

11. The network access point of claim 8, wherein the ability of the wireless devices to communicate with the devices on the Ethernet network through the network access point is adjusted in accordance with the output of the at least one of the security-oriented modules in that an antenna pattern of the network access point is adjusted in accordance with the output of the motion detector.

12. A method comprising:

providing a network access point having a controller, a wireless interface, and a wired network interface, the wireless interface to permit the network access point to communicate with wireless devices, the wired network interface to permit the network access point to communicate with an Ethernet network, such that the wireless devices are able to communicate with devices on the Ethernet network through a network access point, such that the wireless interface and the wired network interface together permit the wireless devices to communicate with the devices on the Ethernet network through the network access point;

providing at least one of an internal interface and an external interface within the network access point;

providing at least one of one or more internal modules coupled with the internal interface and one or more external modules coupled with the external interface, the internal modules and the external modules being security-oriented modules; and, permitting the network access point to adjust the ability of the wireless devices to communicate with the devices on the Ethernet network through the network access point, as permitted by the wireless interface and the wired network interface together, in accordance with an output of at least one of the security-oriented modules, wherein the internal modules and the external modules comprise one or more of a smoke detector, a temperature sensor, a humidity sensor, a light sensor, an emergency light, and a motion detector.

13. The method of claim 12, wherein at least one of the external modules and the internal modules comprises a backup battery;

wherein at least one of the external modules and the internal modules are arranged to receive power to recharge the backup battery from the network access point; and wherein the network access point is itself arranged to receive power from the wired network interface using power-over-Ethernet (POE).

14. The method of claim 12, wherein the controller is arranged to modify wireless interface parameters based on a signal from at least one of the external modules and the internal modules.

15. The method of claim 12, wherein the network access point is arranged to receive power sufficient to operate the network access point, including the at least one of the internal interface and the external interface and the internal modules, via the wired network interface.

16. The method of claim 12, wherein one of either one or more of the internal modules or one or more of the external modules is communicatively coupled with another of either one or more of the internal modules or one of the external modules.

17. The method of claim 12, wherein the at least one of the security-oriented modules comprises the motion detector.

18. The method of claim 17, wherein the ability of the wireless devices to communicate with the devices on the Ethernet network through the network access point is adjustable in accordance with the output of the at least one of the security-oriented modules in that where the motion detector does not detect any motion, the network access point is powered down.

19. The method of claim 17, wherein the ability of the wireless devices to communicate with the devices on the Ethernet network through the network access point is adjustable in accordance with the output of the at least one of the security-oriented modules in that a power of an antenna of the network access point is adjusted in accordance with the output of the motion detector.

20. The method of claim 17, wherein the ability of the wireless devices to communicate with the devices on the Ethernet network through the network access point is adjusted in accordance with the output of the at least one of the security-oriented modules in that an antenna pattern of the network access point is adjusted in accordance with the output of the motion detector.

* * * * *